June 26, 1945.  W. H. PETERSEN  2,379,179
JOINING AND CORNERING STRIP
Filed April 12, 1943  2 Sheets-Sheet 2
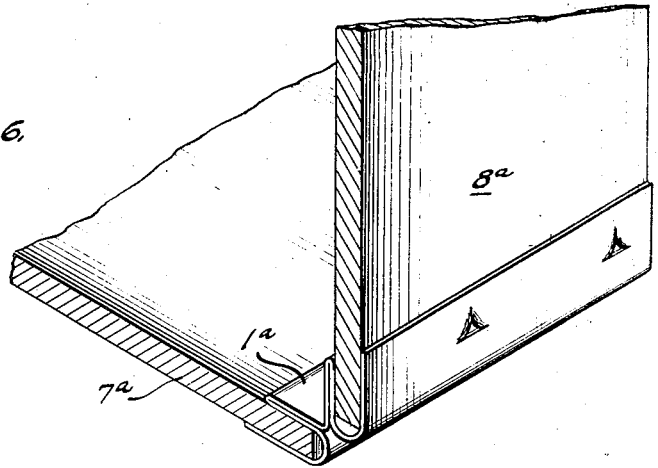
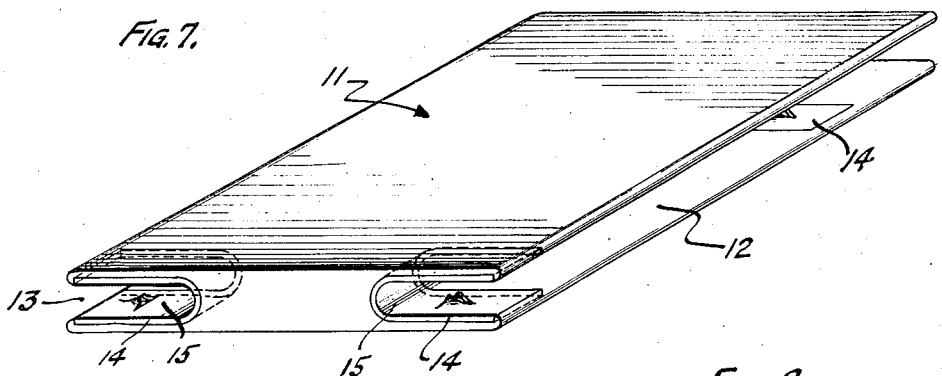
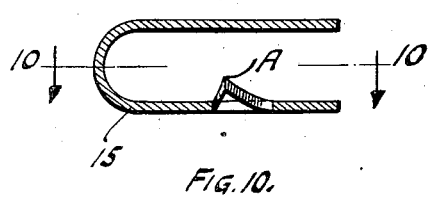
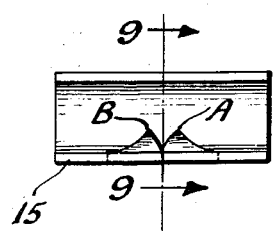
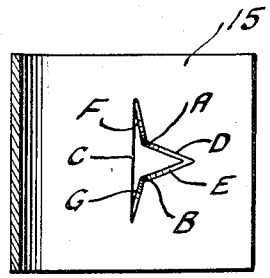
INVENTOR:
William H. Petersen,
BY Theodore W. Miller,
ATTORNEY.

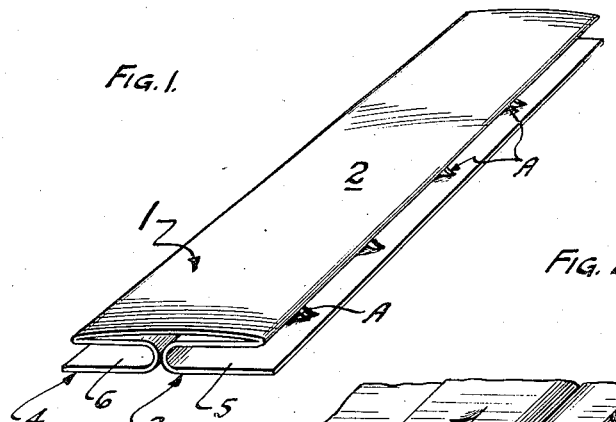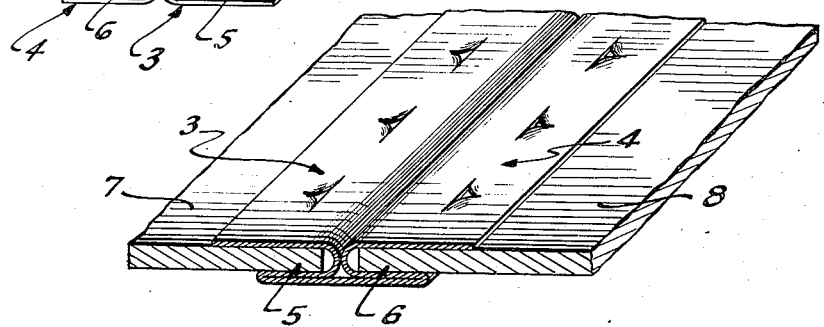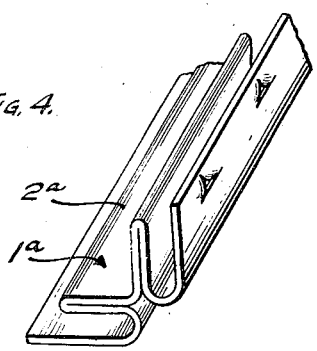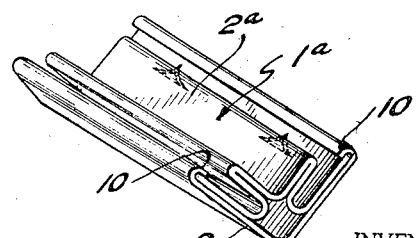

Patented June 26, 1945

2,379,179

UNITED STATES PATENT OFFICE 2,379,179

JOINING AND CORNERING STRIPS

William H. Petersen, Chicago, Ill., assignor to Sheetlock Company, Chicago, Ill., a firm consisting of himself, William G. Knox, and Forrest R. Grooms, copartners Application April 12, 1943, Serial No. 482,814

10 Claims. (Cl. 20—92)

This invention relates to joining and cornering strips.

It is highly desirable to provide a strip having means associated therewith whereby the strip may readily and conveniently join and/or corner rigid or flexible boards without the necessity of drilling any holes or making any special preparation of the boards and without the necessity of any tools, screws, nails, bolts or other accessories being used.

The primary object of this invention is accordingly to provide such a strip.

Other and further objects of this invention will become more apparent hereinafter from an examination of the specification and claims in conjunction with the accompanying drawings wherein:

Fig. 1 is a perspective view of a joining strip embodying this invention;

Fig. 2 is an upside down perspective view of the same strip in use and joining two boards;

Fig. 3 is a cross-sectional view showing the manner in which the notch grips and holds the boards together;

Fig. 4 is a perspective view of a cornering and joining strip embodying this invention;

Fig. 5 is a perspective view of a modified form of strip similar to that of Fig. 4;

Fig. 6 is a view similar to that of Fig. 4 showing the strip in use;

Fig. 7 is a perspective view of a modified form of joining strip;

Fig. 8 is an enlarged end and detailed view of one of the clips forming a portion of the strip of Fig. 7;

Fig. 9 is a sectional view taken at the line 9—9 of Fig. 8; and

Fig. 10 is a sectional view taken at the line 10—10 of Fig. 9.

Referring to the drawings more particularly, in Figs. 1, 2 and 3 there is shown a sheet metal strip 1, in this instance of cold-rolled steel, for joining ends of ducts, seams of casings or ducts or for any continuous flat work.

The strip 1 is preferably cold-rolled sheet steel and has a central axially extending shank 2 with its opposed marginal portions 3 and 4 bent to form opposed receiving channels 5 and 6, respectively, for boards 7 and 8 to be joined.

When the edges of the boards 7 and 8 are inserted in their respective receiving channels 5 and 6, they are automatically fastened and retained therein by virtue of inwardly struck integral fastening and locking tangs A and B, which will be more particularly described hereinafter. As shown especially in Fig. 3 the rounded bottom of each receiving channel 5 and 6 makes a tight joint with the edge of the board without the use of cement or putty.

In the modification shown in Fig. 4 the central axially extending shank 2a of a strip 1a corresponding to 2 of the first embodiment is bent along its longitudinal center line at a ninety degree angle (or other angle according to requirements) so as to corner as well as join the boards (here designated 7a and 8a). The other parts of the strip 1a are similar to the corresponding parts of strip 1. It will be noted that the shank 1a presents a smooth inner surface making it ideal for use in joining the seams of ducts since no interference to fluid flow results.

In the modification shown in Fig. 5 a smooth outside corner surface is provided as well as the smooth inside corner surface by adding to the features of the form shown in Figs. 4 and 6, an angular snap fastening strip 9 which has return bent edges 10 which fasten over the corresponding edges of the strip 1a at the outer edges of the receiving channels.

In the modification shown in Fig. 7 the joining strip, here designated 11, is made of plastic and has opposed receiving channels 12 and 13, for the boards, formed in its opposite edges. The walls of the plastic strip 11 at longitudinally spaced positions in the channels 12 and 13 are recessed as at 14 to readily receive and retain U-shaped spring clips 15. These clips 15 are preferably of spring cold-rolled steel and each is provided with inwardly struck integral fastening and locking tangs for automatically fastening and retaining the board edges in the receiving channels 12 and 13 when said edges are inserted therein.

The details of the form, shape and function of these inwardly struck fastening and locking tangs are the same in all modifications so that their description for the last modification should suffice.

The punch, which cuts the tangs A and B makes a T-cut including a cut C parallel with the longitudinal axis of the joining (or cornering) strip and the edges of the boards to be joined, and which punch simultaneously forms said tangs in the shape of spaced similar sharp points with spring-like sloping surfaces D and E leading up to each point from the direction in which the boards are inserted into the chanels and presenting comparatively non-yielding shoulders F and G against withdrawal of the boards. The edges of shoulders F and G extend approximately to a plane which is parallel to the axis of the channel.

The use and advantages of the aforedescribed strips will be apparent without further detail.

I am aware that many changes may be made without departing from the principles of my invention and I therefore, do not wish to be limited to the details shown and described.

I claim:

1. A strip for adjoining adjacent edges of sheet-like material comprising a central shank having opposed longitudinally extending receiving channels for receiving said adjacent edges, said strip being provided with spaced sheet metal portions in said channels, each said portion having a pair of adjacent inwardly struck right angular pointed tangs formed by a T-cut and presenting edges sloping into the channel and away from the entrance thereto and also presenting edges providing effective shoulders both of which extend approximately to a plane parallel to the axis of the strip and channel whereby said tangs will permit movement of said material into the channels and will lock the material therein.

2. A strip for joining adjacent edges of sheet-like material comprising a central shank having opposed longitudinally extending receiving channels for receiving said adjacent edges, said strip being provided with spaced sheet metal portions in said channels, each said portion having an inwardly struck angular pointed tang formed from a right angular cut, one edge of said portion, at said cut, being parallel to the axis of the channel, whereby the tang presents one edge forming an effective shoulder against removal of the material from the channel and one edge sloping into the channel and away from the entrance thereto to permit entrance of the material thereinto.

3. A sheet metal strip for joining adjacent edges of sheet-like material comprising a central flat shank and marginal portions on either side of the shank folded double to form opposed longitudinally extending receiving channels for receiving said adjacent edges, said strip having inwardly struck angular pointed tangs in said channels, each formed from a right angular cut, one edge of said strip, at said cut, being parallel to the axis of the channel whereby the tang presents one edge forming an effective shoulder against removal of the material from the channel and one edge sloping into the channel and away from the entrance thereto to permit entrance of the material thereinto.

4. A plastic strip for joining adjacent edges of sheet-like material comprising a central shank having opposed longitudinally extending receiving channels for receiving said adjacent edges, said strip being provided with spaced sheet metal portions in said channels, each said portion having an inwardly struck angular pointed tang presenting one edge sloping into the channel and away from the entrance thereto and also presenting an edge in a plane approximately parallel to the axis of the strip and channel whereby said tang will permit movement of the material into the channel and then lock the material therein.

5. A strip for joining and cornering adjacent edges of sheet-like material comprising a central shank bent angularly along its axis and provided with angularly disposed longitudinally extending receiving channels for receiving said adjacent edges, said strip being provided with spaced sheet metal portions in said channels, each said portion having an inwardly struck angular pointed tang formed from a right angular cut, one edge of said portion, at said cut, being parallel to the axis of the channel, whereby the tang presents one edge forming an effective shoulder against removal of the material from the channel and one edge sloping into the channel and away from the entrance thereto to permit entrance of the material thereinto.

6. A strip for joining and cornering adjacent edges of sheet-like material comprising a central sheet metal shank and marginal portions on either side of the shank folded double to form longitudinally extending receiving channels for receiving said edges, the shank bent longitudinally along its axis whereby said channels are disposed in planes at an angle to each other, said strip having inwardly struck angular pointed tangs in said channels, each formed from a right angular cut, one edge of said strip, at said cut, being parallel to the axis of the channel whereby the tang presents one edge forming an effective shoulder against removal of the material from the channel and one edge sloping into the channel and away from the entrance thereto to permit entrance of the material thereinto.

7. A sheet metal strip for joining and cornering adjacent edges of sheet-like material comprising a central shank and marginal portions on either side of the shank folded double to form longitudinally extending receiving channels for receiving said edges, said shank being bent longitudinally along its axis to dispose said channels in planes at an angle to each other, said strip having means permitting movement of the material into the channels and then locking the material therein, and a sheet metal outer strip correspondingly bent longitudinally along its axis and provided with inwardly bent marginal portions for engaging the outer edges of said channels.

8. A plastic strip for joining adjacent edges of sheet-like material comprising a central shank having opposed longitudinally extending receiving channels for receiving said adjacent edges, said strip being provided with spaced spring clips adapted to be inserted in retaining recesses in said channels, each clip having an inwardly struck angular pointed tang presenting one edge sloping into the channel and away from the entrance thereto and also presenting an edge in a plane approximately parallel to the axis of the strip and channel whereby said tang will permit movement of the material into the channel and then lock the material therein.

9. A plastic strip for joining adjacent edges of sheet-like material comprising a central shank having opposed longitudinally extending receiving channels for receiving said adjacent edges, said strip being provided with spaced spring clips adapted to be inserted in retaining recesses in said channels, each clip having means for permitting inward movement of the material into the channel and then locking the material therein.

10. A sheet metal device for joining adjacent edges of sheet-like material, comprising a folded portion forming a receiving channel, said portion having a pair of adjacent inwardly struck angular pointed tangs formed by a T-cut and presenting adjacent edges sloping into the channel and away from the entrance thereto and also presenting edges extending approximately to a plane parallel to the axis of the channel whereby said tangs will permit movement of said material into the channel and will lock the material therein.

WILLIAM H. PETERSEN.